US012565028B2

(12) United States Patent (10) Patent No.: US 12,565,028 B2
Tanaka et al. (45) Date of Patent: Mar. 3, 2026

(54) MULTILAYER BODY AND PACKAGING MATERIAL

(71) Applicant: TOPPAN Holdings Inc., Tokyo (JP)

(72) Inventors: Ryota Tanaka, Tokyo (JP); Shinya Ochiai, Tokyo (JP)

(73) Assignee: Toppan Holdings Inc., Tokyo (JP)

( * ) Notice: Subject to any disclaimer, the term of this patent is extended or adjusted under 35 U.S.C. 154(b) by 278 days.

(21) Appl. No.: 18/332,888

(22) Filed: Jun. 12, 2023

(65) Prior Publication Data

US 2023/0330976 A1 Oct. 19, 2023

Related U.S. Application Data

(63) Continuation of application No. PCT/JP2021/046678, filed on Dec. 17, 2021.

(30) Foreign Application Priority Data

Dec. 17, 2020 (JP) ................................. 2020-209293

(51) Int. Cl.
B32B 27/08 (2006.01)
B32B 7/12 (2006.01)
(Continued)

(52) U.S. Cl.
CPC ................ B32B 27/08 (2013.01); B32B 7/12 (2013.01); B32B 27/32 (2013.01); B65D 65/40 (2013.01); B32B 2250/03 (2013.01); B32B 2250/242 (2013.01); B32B 2255/20 (2013.01); B32B 2255/26 (2013.01); B32B 2255/28

(2013.01); B32B 2307/31 (2013.01); B32B 2307/4023 (2013.01); B32B 2307/558 (2013.01);
(Continued)

(58) Field of Classification Search
None
See application file for complete search history.

(56) References Cited

U.S. PATENT DOCUMENTS

2021/0023828 A1 1/2021 Yamada et al.

FOREIGN PATENT DOCUMENTS

JP 2019-171861 A 10/2019
JP 2020-040258 A 3/2020
(Continued)

OTHER PUBLICATIONS

International Search Report issed in corresponding International Application No. PCT/JP2021/046678 dated Feb. 8, 2022.

*Primary Examiner* — Ramsey Zacharia
(74) *Attorney, Agent, or Firm* — Knobbe Martens Olson & Bear, LLP

(57) ABSTRACT
This multilayer body is provided with a base layer, an intermediate layer, a heat seal layer, a first adhesive layer that is provided between the base layer and the intermediate layer, and a second adhesive layer that is provided between the intermediate layer and the heat seal layer. The base layer, the intermediate layer, and the heat seal layer are configured to include polyethylene. In a case where the base layer is a stretched polyethylene film, the intermediate layer is an unstretched polyethylene film, and in a case where the intermediate layer is a stretched polyethylene film, the base layer is an unstretched polyethylene film. The proportion of polyethylene in the multilayer body is 90% by mass or more.

7 Claims, 2 Drawing Sheets

(51) Int. Cl.
  *B32B 27/32* (2006.01)
  *B65D 65/40* (2006.01)
(52) U.S. Cl.
  CPC . *B32B 2307/581* (2013.01); *B32B 2307/7244*
       (2013.01); *B32B 2307/7246* (2013.01); *B32B*
                                  *2553/00* (2013.01)

(56)                References Cited

FOREIGN PATENT DOCUMENTS

| JP | 2020-055157 |   | 4/2020 |
| JP | 2020-055162 | A | 4/2020 |
| JP | 2020-055163 | A | 4/2020 |
| JP | 2020-055172 | A | 4/2020 |
| JP | 2020-055181 |   | 4/2020 |
| JP | 2020-157514 | A | 10/2020 |
| JP | 2020-157719 | A | 10/2020 |
| JP | 2020-157721 | A | 10/2020 |
| JP | 2020-157729 | A | 10/2020 |
| JP | 2020-158192 | A | 10/2020 |
| JP | 2020-203405 | A | 12/2020 |
| JP | 2020-203406 |   | 12/2020 |
| WO | WO-2019189092 A1 * | 10/2019 | ............. B32B 27/08 |

* cited by examiner

MULTILAYER BODY AND PACKAGING MATERIAL

CROSS REFERENCE TO RELATED APPLICATIONS

This application is a continuation application based on PCT International Patent Application No. PCT/JP2021/046678, filed on Dec. 17, 2021, which claims priority to Japanese Patent Application No. 2020-209293, filed on Dec. 17, 2020, in the Japan Patent Office. The contents of both the Japanese Patent Application and the PCT Application are incorporated herein by reference.

FIELD OF THE INVENTION

The present invention relates to a multilayer body, and more particularly to a multilayer body having excellent recyclability. A packaging material formed of this multilayer body will also be described.

DESCRIPTION OF RELATED ART

With an increasing demand for building a recycling-oriented society, there is a demand for packaging materials having high recyclability. In general, a packaging material, in which the proportion of a main resin included is 90% by mass or more, is considered as having high recyclability. However, many packaging materials of the related art are configured to include a plurality of resin materials and thus do not satisfy this standard. Therefore, currently, the packaging materials are not recycled.

In relation to this problem, Japanese Unexamined Patent Application, First Publication No. 2020-55157 discloses that a multilayer body includes a base layer, an adhesive layer, and a heat seal layer, and the base layer and the heat seal layer are formed of polyethylene. It is easier to satisfy the above standard, since the base layer and the heat seal layer are formed of the same material.

A stretched polyethylene film is used as the base layer.

The inventors found that, in a case where a multilayer body disclosed in Japanese Unexamined Patent Application, First Publication No. 2020-55157 is applied to a packaging material, the strength may not be sufficient.

The inventors solved this problem while maintaining high recyclability.

An object of the present invention is to provide a multilayer body that has a sufficient strength in a case of being applied to a packaging material and that is easy to recycle.

SUMMARY OF INVENTION

A first aspect of the present invention is a multilayer body including a base layer, an intermediate layer, a heat seal layer, a first adhesive layer that is provided between the base layer and the intermediate layer, and a second adhesive layer that is provided between the intermediate layer and the heat seal layer.

The base layer, the intermediate layer, and the heat seal layer are configured to include polyethylene.

In a case where the base layer is a stretched polyethylene film, the intermediate layer is an unstretched polyethylene film, and in a case where the intermediate layer is a stretched polyethylene film, the base layer is an unstretched polyethylene film.

The proportion of polyethylene in the multilayer body is 90% by mass or more.

A second aspect of the present invention is a packaging material formed of the multilayer body according to the first aspect by joining the heat seal layer.

The multilayer body of the present invention has a sufficient strength in a case of being applied to a packaging material and is easy to recycle.

DETAILED DESCRIPTION OF THE PREFERRED EMBODIMENTS

Hereinafter, a first embodiment of the present invention will be described with reference to FIGS. 1 and 2.

Figure 1:
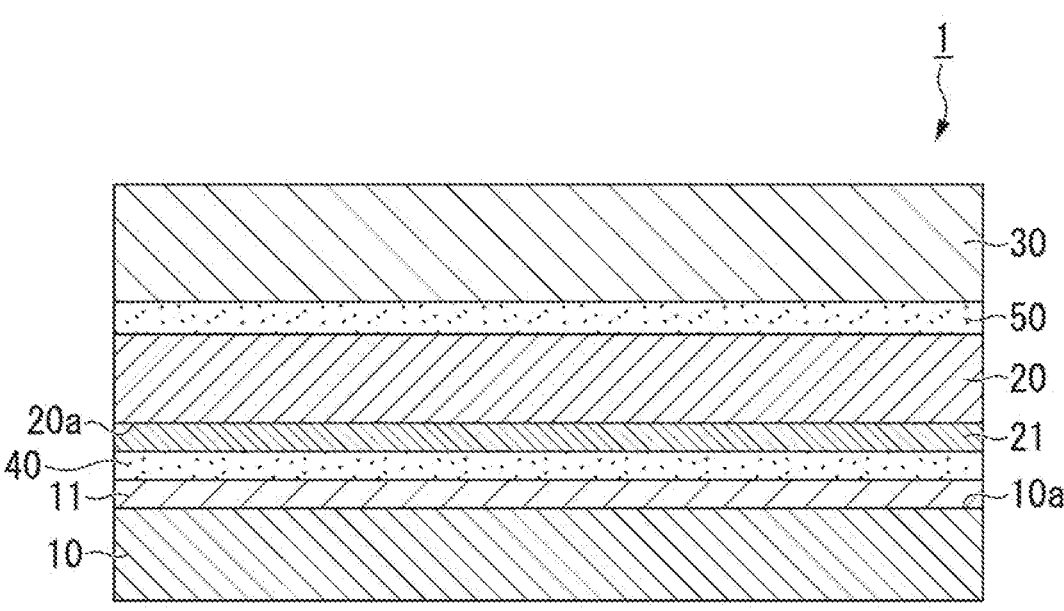
FIG. 1 is a schematic cross-sectional view of a multilayer body according to a first embodiment of the present invention.

FIG. 1 is a schematic cross-sectional view of a multilayer body 1 according to the present embodiment. The multilayer body 1 includes a base layer 10, an intermediate layer 20, and a heat seal layer 30. The base layer 10 and the intermediate layer 20 are joined by a first adhesive layer 40. The intermediate layer 20 and the heat seal layer 30 are joined by a second adhesive layer 50.

The base layer 10 is a stretched film formed of polyethylene. This is a part that becomes an outer surface in a case of forming a packaging material by using the multilayer body 1.

The base layer 10 may be a uniaxially stretched film or a biaxially stretched film. A draw ratio of the stretched film in a machine direction (MD) is preferably 2 times or more and 10 times or less and more preferably 3 times or more and 7 times or less. By setting the draw ratio to 2 times or more, a strength and heat resistance of the multilayer body 1 can be improved. The upper limit of the draw ratio is not particularly limited; however, it is preferably set to 10 times or less, from the viewpoint of the breaking limit of the stretched film.

In a case of a biaxially stretched film, the draw ratio thereof in a direction (transverse direction (TD)) perpendicular to the MD is preferably 2 times or more and 10 times or less and more preferably 3 times or more and 7 times or less, in the same manner as described above. The draw ratio in the MD and the draw ratio in the TD may be different, but are preferably the same.

The polyethylene included in the base layer 10 is preferably high-density polyethylene (HDPE) or medium-density polyethylene (MDPE), from viewpoints of a strength, heat resistance, and stretchability, and more preferably MDPE, from the viewpoint of stretchability. It is also possible to use a stretched polyethylene film having a multilayer structure obtained by extruding polyethylenes having different densities by a co-extrusion method, as the base layer 10.

As HDPE, polyethylene having a density of 0.945 g/cm³ or more can be used, and as MDPE, polyethylene having a density of 0.925 g/cm³ or more and less than 0.945 g/cm³ can be used.

The polyethylenes having different densities and branches as described above can be obtained by appropriately selecting a polymerization method. For example, the polymerization may be preferably performed in one stage or multiple stages of two or more stages, by any method of gas phase polymerization, slurry polymerization, solution polymerization, and high-pressure ion polymerization by using a multi-site catalyst such as a Ziegler-Matta catalyst or a single-site catalyst such as a metallocene-based catalyst, as a polymerization catalyst.

The single-site catalyst described above is a catalyst capable of forming uniform active species, and is usually prepared by bringing a metallocene-based transition metal compound or a non-metallocene-based transition metal compound into contact with an activating cocatalyst. The single-site catalyst is preferable to the multi-site catalyst, because an active site structure is uniform and a polymer having a high molecular weight and a highly uniform structure be polymerized. As the single-site catalyst, it is particularly preferable to use the metallocene-based catalyst. The metallocene-bed catalyst is a catalyst including a transition metal compound of Group IV of the periodic table containing a ligand having a cyclopentadienyl skeleton, a cocatalyst, an organic metal compound as necessary, and each catalyst component of a carrier.

In the transition metal compound of Group fir of the periodic table containing the ligand having the cyclopentadienyl skeleton, the cyclopentadienyl skeleton is a cyclopentadienyl group, a substituted cyclopentadienyl group, or the like. The substituted cyclopentadienyl group has a substituent of at least one selected from a hydrocarbon group having 1 to 30 carbon atoms, a silyl group, a silyl-substituted alkyl group, a silyl-substituted aryl group, a cyano group, a cyanoalkyl group, a cyanoaryl group, a halogen group, a haloalkyl group, and a halosilyl group. The substituted cyclopentadienyl group may have two or more substituents, and the substituents may be bonded to each other to form a ring, such as an indenyl ring, a fluorenyl ring, an azulenyl ring, or a hydrogenated body thereof. The rings formed by bonding the substituents to each other may further have substituents.

In the transition metal compound of Group IV of the periodic table containing the ligand having the cyclopentadienyl skeleton, as the transition metal, zirconium, titanium, and the like are exemplary examples, and zirconium and hafnium are particularly preferable. The transition metal compound usually has two ligands having the cyclopentadienyl skeleton, and the ligands having the cyclopentadienyl skeleton are preferably bonded to each other by a crosslinking group. In addition, as the crosslinking group, an alkylene group having 1 to 4 carbon atoms, a silylene group, a dialkylsilylene group, a substituted silylene group such as a diarylsilylene group, a substituted germylene group such as a dialkylgermylene group or a diarylgermylene group, and the like are exemplary examples. The crosslinking group is preferably a substituted silylene group. The transition metal compound of Group IV of the periodic table containing the ligand having the cyclopentadienyl skeleton can include one or a mixture of two or more thereof as a catalyst component.

The cocatalyst is one that can make the transition metal compound of Group IV of the periodic table effective as a polymerization catalyst, or one that can balance ionic charges in a catalytically activated state. As the cocatalyst, benzene-soluble aluminoxane of an organoaluminumoxy compound or a benzene-insoluble organoaluminumoxy compound, ion-exchange layered silicate, a boron compound, an ionic compound formed of cations containing or not containing an active hydrogen group and non-coordinating anions, lanthanide salt such as lanthanum oxide, tin oxide, a phenoxy compound containing a fluoro group, and the like are exemplary examples.

The transition metal compound of Group IV of the periodic table containing the ligand having the cyclopentadienyl skeleton may be used by being carried by a carrier of an inorganic or organic compound. As the carrier, porous oxide of an inorganic or organic compound is preferable. Specifically, ion-exchange layered silicate such as montmorillonite, $SiO_2$, $Al_2O_3$, MgO, $ZrO_2$, $TiO_2$, $B_2O_3$, CaO, ZnO, BaO, $ThO_2$, and a mixture thereof are exemplary examples. As the organic metal compound used as necessary, an organoaluminum compound, an organomagnesium compound, an organozinc compound, and the like are exemplary examples. Among these, organic aluminum is preferably used.

A copolymer of ethylene and other monomers can also be used as long as the features of the present invention are not impaired. As an ethylene copolymer, a copolymer formed of ethylene and α-olefins having 3 to 20 carbon atoms are exemplary examples. As α-olefins having 3 to 20 carbon atoms, propylene, 1-butene, 1-pentene, 1-hexene, 1-octene, 1-decene, 1-dodecene, 1-tetradecene, 1-hexadecene, 1-octadecene, 1-eicosene, 3-methyl-1-butene, 4-methyl-1-pentene, 6-methyl-1-heptene, and the like are exemplary examples. In addition, it may be a copolymer of vinyl acetate or acrylic acid ester or the like, as long as the object of the present invention is not impaired.

In the present invention, as a raw material for obtaining the high-density polyethylene or the like, biomass-derived ethylene may be used instead of ethylene obtained from fossil fuels. Since such biomass-derived polyethylene is a carbon-neutral material, it is possible to obtain a packaging material with even less burden on the environment. Such biomass-derived polyethylene can be produced, for example, by a method as disclosed in Japanese Unexamined Patent Application, First Publication No. 2013-177531. Alternatively, commercially available biomass-derived polyethylene (for example, Green PE available from Braskem) tray be used.

Polyethylene recycled by mechanical recycling can also be used for the base layer 10. Here, the mechanical recycling generally means a method of pulverizing collected polyethylene films or the like, removing dirt and foreign matters on film surfaces by alkali washing, performing diffusion and decontamination of contaminants remaining inside the films by drying at a high temperature under reduced pressure for a predetermined time, removing dirt of the films formed of polyethylene, melting and manufacturing films to return them to polyethylene films again.

An ink layer 1 is formed on a first surface 10a of the base layer 10 on a side joined to the intermediate layer 20. The ink layer 11 imparts an indication about a content and various patterns to the multilayer body. The ink layer 11 provided on the first surface 10a is not exposed to an outer surface, in a case where the packaging material is manufactured. Accordingly, damage and deterioration of the display after manufacturing are suppressed.

The ink layer 11 is formed over the entire part of the first surface 10a by using ink having a light shielding property, thereby protecting the content from light. Such an ink layer having a light shielding property can be manufactured by, for example, including a white pigment and a black pigment on one or a plurality of white ink layers formed by full-surface printing (solid printing), overprinting a chromatic ink having a proportion of the black pigment in all pigments of 3 to 5 wt % by solid printing, and forming a chromatic ink layer having chroma of 1 to 4 in the Munsell color system.

By combining a light-shielding ink layer and a printed layer (image-printed layer) with patterns, characters, and the like formed of ink having no light shielding property, it is possible to impart the light shielding property while freely setting appearance of the ink layer 11. In this case, the image-printed layer is first formed on the base layer 10 and then the light-shielding ink layer is formed, thereby obtaining excellent visibility of an image.

The ink layer 11 is preferably formed of the biomass-derived ink. Therefore, it is possible to manufacture a packaging material with even less burden on the environment by using the multilayer body 1. A method for forming an image is not particularly limited, and well-known various printing methods of the related art such as a gravure printing method, an offset printing method, a flexographic printing method, and the like can be used. Among these, the flexographic printing method is preferable, from the viewpoint of the burden on the environment.

In order to improve adhesiveness of the ink layer 11, a surface treatment such as a corona treatment or a plasma treatment may be performed on the first surface 10*a* of the base layer 10.

The base layer 10 is a stretched film and has excellent transparency. Accordingly, in the multilayer body 1, the indication by the ink layer 11 provided on the first surface 10*a* side can be suitably visually recognized. The transparency that enables suitable visibility is obtained, in a case where a haze value measured based on JIS K 7105 is 20% or less, and is more excellent, in a case where the haze value is 10% or less.

The thickness of the base layer 10 is preferably 10 μm or more and 50 μm or less and more preferably 12 μm or more and 35 μm or less. By setting the thickness of the base layer 10 to 10 μm or more, a strength of the multilayer body 1 can be improved. By setting the thickness of the base layer 10 to 50 μm or less, the workability of the multilayer body 1 can be improved.

The base layer 10 can include additives, as long as the features of the present invention are not impaired. As the additives, for example, a cross-linking agent, an antioxidant, an anti-blocking agent, a slip agent, a ultraviolet absorber, a light stabilizer, a filler, a reinforcing agent, an antistatic agent, a pigment, a modifying resin, or the like can be used.

The thickness of the base layer 10 is preferably 10 μm or more and 50 μm or less and more preferably 12 μm or more and 35 μm or less. By setting the thickness of the base layer 10 to 10 μm or more, a strength of the multilayer body 1 can be improved.

In addition, by setting the thickness of the base layer 10 to 50 μm or less, the workability of the multilayer body 1 can be improved.

The intermediate layer 20 is an unstretched film formed of polyethylene. As the polyethylene included in the intermediate layer 20, HDPE and MDPE are preferable, from viewpoints of the strength and heat resistance. In the same manner as the base layer 10, the intermediate layer 20 may be a multilayer film.

The thickness of the intermediate layer 20 is preferably 9 μm or more and 50 μm or less and more preferably 12 μm or more and 30 μm or less. By setting the thickness of the intermediate layer 20 to 9 μm or more, the strength and the heat resistance of the multilayer body 1 can be improved. By setting the thickness of the intermediate layer 20 to 50 μm or less, the workability of the multilayer body 1 can be improved.

The intermediate layer 20 can be manufactured by forming a polyethylene film using a T-die method, an inflation method, or the like.

In a case where the intermediate layer 20 is manufactured using the T-die method, a melt flow rate (MFR) of polyethylene is preferably 3 g/10 minutes or tore and 20 g/10 minutes or less. By setting the MFR to 3 g/10 minutes or more, the workability of the multilayer body 1 can be improved. In addition, by setting the MFR to 20 g/10 minutes or less, it is possible to prevent the manufactured base layer from breaking.

In a case where the intermediate layer 20 is manufactured using the inflation method, the MFR of polyethylene is preferably 0.5 g/10 minutes or more and 5 g/10 minutes or less. By setting the MFR to 0.5 g/10 minutes or more, the workability of the multilayer body 1 can be improved. In addition, by setting the MFR to 5 g/10 minutes or less, film ability can be improved.

The unstretched film to be the intermediate layer 20 may be manufactured by the method described above, or a commercially available film may be purchased.

A gas barrier layer 21 is formed on one surface of the intermediate layer 20. In the present embodiment, the gas barrier layer 21 is formed on the first surface 20*a* facing the base layer 10. The gas barrier layer 21 may be formed on the opposite side.

The gas barrier layer 21 imparts an oxygen barrier property and a water vapor barrier property to the multilayer body 1.

As a configuration of the gas barrier layer 21, for example, deposited layers formed of metal oxide such as aluminum oxide, silicon oxide, magnesium oxide, tin oxide, or the like are adopted. From viewpoints of transparency and the barrier property, the metal oxide may be selected from a group consisting of aluminum oxide, silicon oxide, and magnesium oxide. In addition, considering the cost, the metal oxide may be selected from aluminum oxide and silicon oxide. Furthermore, from the viewpoint of excellent tensile stretchability during processing, a layer formed of silicon oxide is more preferable. As the deposited layer formed of the metal oxide is used as the barrier layer, it is possible to obtain a high barrier property by an extremely thin aver that does not affect the recyclability of the multilayer body 1.

Since the deposited layer formed of the metal oxide has transparency, it is advantageous that a user who gets a packaging material formed of the multilayer body hardly misunderstands that a metal foil is used, compared to a deposited layer formed of metal.

In a case where aluminum oxide is selected as the deposited layer, an O/Al ratio is desirably 1.4 or more. In a case where the O/Al ratio is 1.4 or more, a content ratio of dangling bonds in aluminum atoms is suppressed, thereby easily obtaining excellent transparency. In addition, the O/Al ratio is preferably 1.7 or less. In a case where the O/Al ratio is 1.7 or less, it is possible to prevent the deposited layer from becoming excessively hard due to an increase in crystallinity of AlO, thereby obtaining excellent tensile resistance. In a packaging bag formed of the multilayer body 1, the base layer 10 may shrink due to heat during a boiling process. In this case, in a case where the O/Al ratio of the gas barrier layer 21 is 1.7 or less, it is easy to follow this shrink and it is possible to suppress a deterioration of the barrier property due to occurrence of cracks or the like on the gas barrier layer 21. From the viewpoint of obtaining these effects more sufficiently, the O/Al ratio of the deposited layer to be the gas barrier layer 21 is preferably 1.4 or more and 1.7 or less and more preferably 1.5 or more and 1.55 or less.

In a case where silicon oxide is selected as the deposited layer, an O/Si ratio is desirably 1.7 or more. In a case where the O/Si ratio is 1.7 or more, a content ratio of dangling bonds of silicon atoms is suppressed, thereby easily obtaining excellent transparency. In addition, the O/Si ratio is preferably 2.0 or less. In a case where the O/Si ratio is 2.0 or less, it is possible to prevent the deposited layer from becoming excessively hard due to an crease in crystallinity of SiO, thereby obtaining excellent tensile resistance. In addition, in a case where the O/Si ratio of the gas barrier layer 21 is 2.0 or less, it is easy to follow this shrink and it is possible to suppress deterioration of the barrier property. From the viewpoint of obtaining these effects more sufficiently, the O/Si ratio of the deposited layer to be the gas barrier layer 21 is preferably 1.75 or more and 1.9 or less and more preferably 1.8 or more and 1.85 or less.

The film thickness of the deposited layer formed of aluminum oxide is preferably 5 nm or more and 30 nm or less. In a case where the film thickness is 5 nm or more, it is possible to obtain sufficient gas barrier property. In addition, in a case where the film thickness is 30 nm or less, it is possible to suppress the occurrence of cracks due to deformation due to internal stress of the thin film, and to suppress a deterioration in the gas barrier property. Also, in a case where the film thickness exceeds 30 nm, the cost is likely to increase due to an increase in the amount of materials used and an increase in film formation time. Accordingly, it is not preferable from an economic viewpoint. From the same viewpoint as above, the film thickness of the deposited layer is more preferably 7 nm or more and 15 nm or less.

The film thickness of the deposited layer formed of silicon oxide is preferably 10 nm or more and 50 nm or less. In a case where the film thickness is 10 nm or more, it is possible to obtain sufficient gas barrier property. In addition, in a case where the film thickness is 50 nm or less, it is possible to suppress the occurrence of cracks due to deformation due to internal stress of the thin film, and to suppress a deterioration in the gas barrier property. Also, in a case where the film thickness exceeds 50 nm, the cost is likely to increase due to an increase in the amount of materials used and an increase in film formation time. Accordingly, it is not preferable from an economic viewpoint. From the same viewpoint as above, the film thickness of the deposited layer is more preferably 20 nm or more and 40 nm or less.

The deposited layer can be formed by, for example, vacuum film formation. In the vacuum film formation, a physical vapor deposition method or a chemical vapor deposition method can be used. As the physical vapor deposition method, a vacuum vapor deposition method, a sputtering method, an ion plating method, and the like are exemplary examples, but there is no limitation thereto. As the chemical vapor deposition method, a thermal CVD method, a plasma CVD method, an optical CVD method, and the like are exemplary examples, but there is no limitation thereto.

In the vacuum film formation, a resistance heating type vacuum vapor deposition method, an electron beam (EB) heating type vacuum vapor deposition method, an induction heating type vacuum vapor deposition method, a sputtering method a reactive sputtering method, a dual magnetron sputtering method, a plasma chemical vapor deposition (PECVD) method, and the like are particularly preferably used. How-ever, considering productivity, the vacuum vapor deposition method is currently the best. As a heating method for the vacuum vapor deposition method, it is preferable to use any one of an electron beam heating method, a resistance heating method, and an induction heating method.

As in the present embodiment, in a case where the intermediate layer 20 includes the gas barrier layer 21, an anchor coating layer may be formed by using an anchor coating agent on a surface on a side, where the gas barrier layer is formed. Therefore, it is possible to improve the adhesiveness of the gas barrier layer formed of metal oxide. As the anchor coating agent, a polyester-based polyurethane resin, a polyether-based polyurethane resin, and the like are exemplary examples. The polyester-based polyurethane resin is preferable, from the viewpoints of heat resistance and interlayer adhesive strength.

In addition, in order to improve the adhesiveness of the first adhesive layer 40, the second adhesive layer 50, and between the gas barrier layer 21 and the anchor coating layer, a surface treatment such as a corona treatment or a plasma treatment may be performed on a surface corresponding to the intermediate layer 20.

The heat seal layer 30 is formed of polyethylene, and is joined by heat sealing in a case of forming a packaging material such as a packaging bag by using the multilayer body 1. From the viewpoint of a heat-sealing property, polyethylene for forming the heat seal layer 30 is preferably low-density polyethylene (LDPE), linear low-density polyethylene (LLDPE), and very low-density polyethylene (VLDPE). In addition, from the viewpoint of the burden on the environment, it is preferable to use the biomass-derived polyethylene or recycled polyethylene for the heat seal layer 30.

As the low-density polyethylene, polyethylene having a density of 0.900 $g/cm^3$ or more and less than 0.925 $g/cm^3$ can be used. As the linear low-density polyethylene, polyethylene having a density of 0.900 $g/cm^3$ or more and less than 0.925 $g/cm^3$ can be used. As the very low-density polyethylene, polyethylene having a density of less than 0.900 $g/cm^3$ can be used.

A copolymer of ethylene and other monomers can be used in the heat seal layer 30, as long as the features of the multilayer body 1 are not impaired.

The heat seal layer 30 may be a single layer or may have a multilayer structure. In a case of having the multilayer structure, a layer including at least one of the MDPE and the HDPE may be included.

For example, a three-layer structure consisting of a layer including at least one of the LDPE, the LLDPE, and the VLDPE/a layer including at least one of the MDPE and the HDPE/a layer including at least one of the LDPE, the LLDPE, and the VLDPE can be used. With such a configuration, it is possible to further improve a bag manufacturing property and a strength of the multilayer body 1 while maintaining the heat-sealing property.

The thickness of the heat seal layer 30 can be suitably changed according to a weight or the like of the content filled in the packaging material to be manufactured. For example, in a case of manufacturing a packaging bag filled with contents of 1 g or more and 200 g or less, the thickness of the heat seal layer 30 is preferably 20 μm or more and 60 μm or less. By setting the thickness to 20 μm or more, it is possible to prevent the filled content from leaking due to breakage of the heat seal layer 30. By setting the thickness to 60 μm or less, workability of the multilayer body 1 can be improved.

As another example, in a case of manufacturing a standing pouch filled with contents of 50 g or more and 2000 g or less, the thickness of the heat seal layer 30 is preferably 50 μm or more and 200 μm or less. By setting the thickness to 50 μm or more, it is possible to prevent the filled content from leaking due to breakage of the heat seal layer 30. In addition, by setting the thickness to 200 µm or less, the workability of the multilayer body 1 can be improved.

The first adhesive layer 40 is a layer including at least one adhesive, is provided between the base layer 10 and the intermediate layer 20, and joins the base layer 10 to the intermediate layer 20. The second adhesive layer 50 is a layer including at least one adhesive, is provided between the intermediate layer 20 and the heat seal layer 30, and joins the intermediate layer 20 to the heat seal layer 30.

Any adhesive such as a one-liquid curing type or two-liquid curing type urethane-based adhesive or the like can also be used for the first adhesive layer 40 and the second adhesive layer 50.

These adhesives may contain a layered inorganic compound, in order to further increase the barrier property.

The first adhesive layer 40 or the second adhesive layer 50 can also be formed by using an adhesive that can exhibit the gas barrier property after curing. In particular, in a case where the first adhesive layer 40 in contact with the gas barrier layer is formed with an adhesive that exhibits the gas barrier property, it is possible to further suppress deterioration of the gas barrier property due to the occurrence of the cracks in the gas barrier layer 21. Therefore, it is possible to further improve the gas barrier performance of the multilayer body 1. As such an adhesive having the gas barrier property, an epoxy-based adhesive, a polyester/polyurethane-based adhesive, and the like are exemplary examples. As specific examples, "Maxive" manufactured by Mitsubishi Gas Chemical Company, Inc., "Paslim" manufactured by DIC Corporation, and the like are exemplary examples.

The thickness of the first adhesive layer 40 and the second adhesive layer 50 is preferably 0.5 µm or more and 6 µm or less, more preferably 0.8 µm or more and 5 µm or less, and even more preferably 1 µm or more and 4.5 µm or less. By setting the thickness of the first adhesive layer 40 and the second adhesive layer 50 to 0.5 µm or more, it is possible to improve the adhesiveness of the first adhesive layer 40 and the second adhesive layer 50. By setting the thickness of the first adhesive layer 40 and the second adhesive layer 50 to 6 µm or less, workability of the multilayer body 1 can be improved.

The first adhesive layer 40 and the second adhesive layer 50 can be formed by, for example, well-known various methods such as a direct gravure roll coating method, a gravure roll coating method, a kiss coating method, a reverse roll coating method, a fountain method, and a transfer roll coating method.

Since the base layer 10, the intermediate layer 20, and the heat seal layer 30 are formed of polyethylene, the proportion of polyethylene in the multilayer body 1 of the present embodiment configured as described above is 90% by mass (wt %) or more. Therefore, the multilayer body 1 has high recyclability.

The proportion (%) of polyethylene in the multilayer body 1 can be calculated by Expression (1).

$$\text{(Mass of the base layer } \mathbf{10} + \text{mass of the intermediate layer } \mathbf{20} + \text{mass of heat seal layer } \mathbf{30})/\text{mass of entire multilayer body } \mathbf{1} \times 100 \qquad (1)$$

In a case where the heat seal layer 30 on a peripheral edge part is joined by heat sealing while remaining a filling portion of the content, in a state where one sheet of the multilayer body 1 is folded with the heat seal layer 30 facing each other or two sheets of multilayer body 1 overlap each other with the heat seal layers 30 facing each other, it is possible to form a packaging bag formed of the multilayer body 1.

A standing pouch can be formed by performing the above joining while sandwiching the folded bottom film.

Therefore, the multilayer body 1 can be applied to various packaging materials.

The packaging bag and standing pouch described above can accommodate various contents such as solid, liquid, and gaseous contents.

The inventors found that a packaging material formed of the multilayer body disclosed in Japanese Unexamined Patent Application, First Publication No. 2020-55157, including a stretched high-density polyethylene film layer, may be easily broken due to impact when dropped. A major factor for this is considered that crystal molecular chains are oriented in a certain direction in the stretched high-density polyethylene film that is the base layer.

Although the details will be described later in examples, the inventors succeeded to improve the strength while maintaining the high recyclability by providing a configuration of combining the intermediate layer 20 formed of the unstretched film with the base layer 10 formed of the stretched film.

The unstretched polyethylene film has a molecular structure in which spherulites are bound together by tie molecules, which are amorphous molecules, and it is considered that, in a case where an impact due to dropping is received, molecular chains folded in the spherulites are stretched and absorbs the drop impact. As a result, it is considered that the strength of the multilayer body 1 as a whole can be improved.

In the present invention, the term "unstretched polyethylene film" refers to a polyethylene film having a structure in which spherical crystals (the spherulites) of approximately 10 to 100 µm each composed of randomly folded polyethylene molecular chains are connected by amorphous molecules. The term "stretched polyethylene film" refers to a polyethylene film having a structure in which the unstretched polyethylene film is stretched at a glass transition temperature or higher and a melting point or lower, the spherical crystals (the spherulites) are broken, and molecular chains are oriented. These structures can be confirmed by observation using a scanning electron microscope (SEM), observation using an X-ray diffraction method, or the like.

A second embodiment of the present invention swill be described with reference to FIG. 2. In the following description, the same reference numerals are used for the common configurations as the configurations described above, and the overlapping description is omitted.

Figure 2:
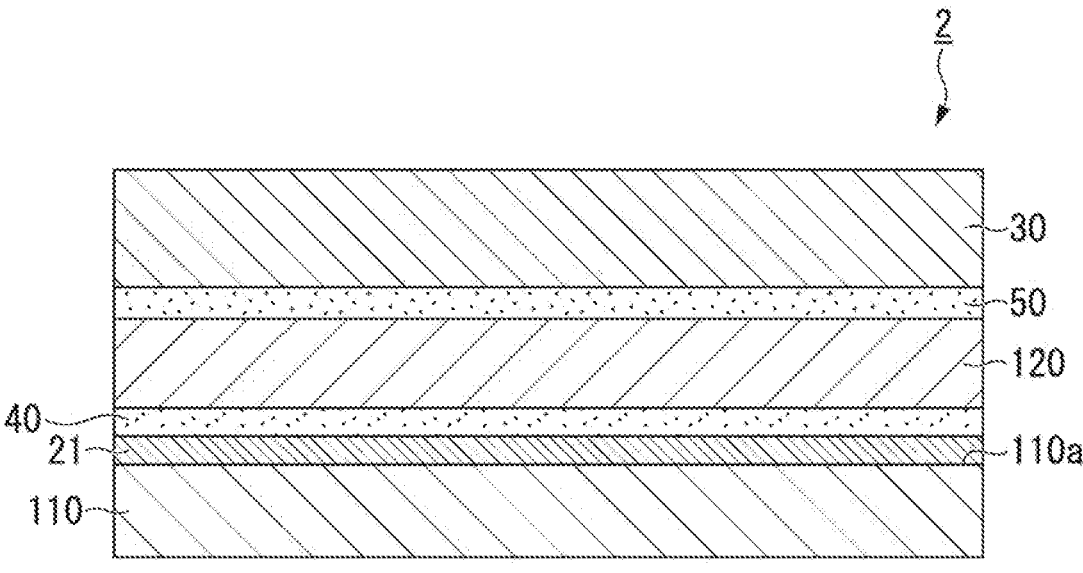
FIG. 2 is a schematic cross-sectional view of a multilayer body according to a second embodiment of the present invention.

FIG. 2 shows a multilayer body 2 according to the present embodiment. The multilayer body 2 includes a base layer 110 instead of the base layer 10, and includes an intermediate layer 120 instead of the intermediate layer 20. The gas barrier layer 21 is formed on a first surface 110*a* of the base layer 110.

The base layer 110 is formed of an unstretched polyethylene film. As the unstretched polyethylene film, the same film as the intermediate layer 20 of the first embodiment can be used.

The intermediate layer 120 is formed of a stretched polyethylene film. As the stretched polyethylene film, the same film as the base layer 10 of the first embodiment can be used.

That is, the multilayer body 2 of the present embodiment can be understood to have a configuration in which the intermediate layer and the base layer in the first embodiment are replaced.

In the same manner as in the first embodiment, the multilayer body 2 of the present embodiment also has a configuration in which the stretched polyethylene film and the unstretched polyethylene film are combined. Therefore, it is possible to satisfy both the improvement of the strength of the multilayer body as a whole and the high recyclability.

In FIG. 2, the example in which the gas barrier layer 21 is formed on the base layer 110 has been described, however, the gas barrier layer 21 may be formed on the intermediate layer 120, in the same manner as in the first embodiment.

In addition, FIG. 2 shows a configuration without an ink layer, but, the ink layer may be provided, in the same manner as in the first embodiment. In this case, the ink layer may be formed on a surface of the gas barrier layer 21 on a side of the first adhesive layer 40.

An overcoat layer for covering the gas barrier layer may be included in both the first embodiment and the second embodiment. The overcoat layer protects the gas barrier layer and exhibits the barrier property independently of the gas barrier layer. In a case of providing the overcoat layer, the ink layer may be formed on the overcoat layer.

The overcoat layer can be formed by using a gas barrier coating layer forming composition (hereinafter, also referred to as a coating agent) including, as a main agent, an aqueous solution including at least one selected from the group consisting of a hydroxyl group-containing polymer compound, metal alkoxide, a silane coupling agent, and hydrolyzate thereof or a mixed solution of water and alcohol.

From the viewpoint of more sufficiently maintaining the gas barrier property after a hot water treatment such as a retort treatment, the coating agent preferably includes at least a silane coupling agent or hydrolyzate thereof, more preferably includes at least one selected from the group consisting of a hydroxyl group-containing polymer compound, metal alkoxide, and hydrolyzate thereof, and a silane coupling agent and hydrolyzate thereof, and even more preferably includes a hydroxyl group-containing polymer compound or hydrolyzate thereof, metal alkoxide or hydrolyzate thereof, and a silane coupling agent or hydrolyzate thereof. The coating agent can be prepared by, for example, mixing the metal alkoxide and the silane coupling agent directly or by performing a treatment such as hydrolysis in advance, with a solution obtained by dissolving the hydroxyl group-containing polymer compound, which is an aqueous polymer, with an aqueous (water or a mixture of water and alcohol) solvent.

Each component included in the coating agent described above will be described in detail. As the hydroxyl group-containing polymer compound used in the coating agent, polyvinyl alcohol (PVA), polyvinyl pyrrolidone, starch, methyl cellulose, carboxymethyl cellulose, sodium alginate, and the like are exemplary examples. It is preferable to use PVA as the coating agent because particularly excellent gas barrier property of the overcoat layer is obtained.

From the viewpoint of obtaining excellent gas barrier property, the overcoat layer is preferably formed of a composition including at least one selected from the group consisting of the metal alkoxide or hydrolyzate thereof represented by General Formula (I).

$$M(OR1)m(R2)n-m \qquad (I)$$

In General Formula (I), R1 and R2 are each independently a monovalent organic group having 1 to 8 carbon atoms, and preferably an alkyl group such as a methyl group or an ethyl group. M represents an n-valent metal atom such as Si, Ti, Al, or Zr. m is an integer of 1 to n. In a case where a plurality of R1's or R2's are present, R1's or R2's may be the same as each other or different from each other.

Specifically, as the metal alkoxide, tetraethoxysilane [Si$(OC_2H_5)_4$], triisopropoxyaluminum [Al$(O$-2'-$C_3H_7)_3$], and the like are exemplary examples. Tetraethoxysilane and triisopropoxyaluminum are preferable, because they are comparatively stable in an aqueous solvent after hydrolysis.

As the silane coupling agent, a compound represented by General Formula (II) is used.

$$Si(OR11)p(R12)3-pR13 \qquad (II)$$

In General Formula (II), R11 represents an alkyl group such as a methyl group or an ethyl group. R12 represents a monovalent organic group such as an alkyl group, aralkyl group, an aryl group, an alkenyl group, an alkyl group substituted with an acryloxy group, or an alkyl group substituted with a methacryloxy group. R13 represents a monovalent organic functional group. p represents an integer of 1 to 3. In a case where a plurality of R11's or R12's are present, R11's or R12's may be the same as each other or different from each other. As the monovalent organic functional group represented by R13, monovalent organic functional groups including a glycidyloxy group, an epoxy group, a mercapto group, a hydroxyl group, an amino group, an alkyl group substituted with a halogen atom, or an isocyanate group are exemplary examples.

Specifically, as the silane coupling agent, silane coupling agents such as vinyl trimethoxysilane, γ-chloropropylmethyldimethoxysilane, γ-chloropropyltrimethoxysilane, glycidoxypropyltrimethoxysilane, γ-methacryloxypropyltrimethoxysilane, or γ-methacryloxypropylmethyldimethoxysilane are exemplary examples.

The silane coupling agent may be a polymer obtained by polymerizing the compound represented by General Formula (II). The polymer is preferably a trimer and more preferably 1,3,5-tris(3-trialkoxysilylalkyl)isocyanurate. This is a condensation polymer of 3-isocyanatoalkylalkoxysilane. It is known that this 1,3,5-tris(3-trialkoxysilylalkyl) isocyanurate loses chemical reactivity in an isocyanate portion, but the reactivity is ensured by polarity of a nurate portion. In general, it is added to the adhesives or the like in the same manner as 3-isocyanate alkylalkoxysilane, and is known as an adhesiveness improving agent. Therefore, by adding 1,3,5-tris(3-trialkoxysilylalkyl)isocyanurate to the hydroxyl group-containing polymer compound, it is possible to improve water resistance of the gas barrier coating layer by hydrogen bonding. 3-isocyan atoalkylalkoxysilane has high reactivity and low liquid stability, whereas 1,3,5-tris (3-trialkoxysilylalkyl) isocyanurate is easily dispersed into an aqueous solution and can stably maintain liquid viscosity, although the nurate portion is not water soluble due to the polarity thereof. In addition, the water resistant performance is equivalent to that of 3-isocyanatoalkylalkoxysilane and 1,3,5-tris(3-trialkoxysilylalkyl)isocyanurate.

1,3,5-Tris(3-trialkoxysilylalkyl)isocyanurate is produced by thermal condensation of 3-isocyanatopropylalkoxysilane, and may contain a raw material of 3-isocyanatopropylalkoxysilane, but there are no problems in particular. 1,3,5-Tris(3-trialkoxysilylpropyl)isocyanurate is more preferable and 1,3,5-tris(3-trimethoxysilylpropyl)isocyanurate is even more preferable. 1,3,5-Tris(3-trimethoxysilylpropyl)isocyanurate is practically advantageous because the methoxy group has a high hydrolysis rate and those containing a propyl group are available at comparatively low cost.

An isocyanate compound or well-known additives such as a dispersant, a stabilizer, a viscosity modifier, or a colorant may be added to the coating agent, as needed, as long as the gas barrier property is not impaired.

The thickness of the overcoat layer is preferably 50 to 1000 nm and more preferably 100 to 500 nm. In a case where the thickness of the overcoat layer is 50 nm or more, it tends to be possible to obtain a more sufficient gas barrier property, and in a case where the thickness thereof is 1000 nm or less, it tends to be possible to maintain sufficient flexibility.

A coating liquid for forming the overcoat layer can be applied by, for example, a dipping method, a roll coating method, a gravure coating method, a reverse gravure coating method, an air knife coating method, a comma coating method, a die coating method, a screen printing method, a spray coating method, a gravure offset method, or the like. A coating film obtained by applying this coating liquid can be dried by, for example, a hot air drying method, a hot roll drying method, a high-frequency irradiation method, an infrared irradiation method, a UV irradiation method, or a combination thereof.

The temperature for drying the coating film can be, for example, 50° C. to 150° C. and is preferably 70° C. to 100° C. By selling the temperature at the time of the drying within the above range, it is possible to further suppress the occurrence of cracks in an inorganic oxide layer or the gas barrier coating layer and exhibit an excellent barrier property.

The overcoat layer may be formed by using a coating agent including a polyvinyl alcohol-based resin and a silane compound. An acid catalyst, an alkali catalyst, a photopolymerization initiator, or the like may be added to this coating agent, as necessary.

As the polyvinyl alcohol-based resin, those described above can be used. As the silane compound, a silane coupling agent, polysilazane, siloxanes, and the like are exemplary examples, and specifically, tetramethoxysilane, tetraethoxysilane, glycidoxypropyltrimethoxysilane, acryloxypropyltrimethoxysilane, hexamethyldisilazane, and the like are exemplary examples.

The multilayer body of the present embodiment will be further described with reference to examples and comparative examples. The present invention is not limited to the specific contents of the examples and comparative examples.

(Preparation of Anchor Coating Agent)

Acrylic polyol and tolylene diisocyanate were mixed such that the number of NCO groups of tolylene di isocyanate is equal to the number of OH groups of acrylic polyol, and was diluted with ethyl acetate such that a total solid content (the total amount of acrylic polyol and tolylene diisocyanate) is 5% by mass. $\beta$-(3,4 Epoxycyclohexyl)trimethoxysilane was further added to the mixed solution after dilution such that the contents are 5 parts by mass with respect to 100 parts by mass of the total amount of acrylic polyol and tolylene diisocyanate, and these were mixed, thereby preparing an anchor coating agent.

(Preparation of Overcoat Agent)

An overcoat agent was prepared by mixing a liquid A, a liquid B, and a liquid C, which will be described later, at a mass ratio of 70/20/10.

Liquid A: A hydrolyzed solution with a solid content of 5% by mass ($SiO2$ conversion) obtained by adding 72.1 g of 0.1 N hydrochloric acid to 17.9 g of tetraethoxysilane ($Si(OC_2H_5)_4$) and 10 g of methanol and stirring for 30 minutes for hydrolysis.

Liquid B: 5% by mass of water/methanol solution of polyvinyl alcohol (a mass ratio of water:methanol is 95:5).

Liquid C: A hydrolyzed solution obtained by diluting 1,35-tris(3-trialkoxysilylpropyl) isocyanurate with a mixed solution of water and isopropyl alcohol (the mass ratio of water:isopropyl alcohol is 1:1) to have a solid content of 5% by mass.

(Preparation of Intermediate Layer A)

The anchor coating agent described above was applied to an unstretched polyethylene film (a three-layer structure of HDPE/MDPE/HDPE) having a thickness of 25 μm with both surfaces subjected to the corona treatment by the gravure coating method, and dried, and an anchor coating layer having a thickness of 0.1 μm was provided. Next, a transparent gas barrier layer (a silica vapor deposition film) formed of silicon oxide and having a thickness of 30 μm was formed by a vacuum vapor deposition apparatus using an electron beam healing method. The O/Si ratio of the silica, vapor deposition film was set to 1.8 by adjusting deposition material species. The overcoat agent described above was applied onto the gas barrier layer by the gravure coating method and dried, and an overcoat layer having a gas barrier function and a thickness of 0.3 μm was formed.

As described above, an intermediate layer A on which a gas barrier layer formed of silica was formed was obtained.

(Preparation of Intermediate Layer B)

An anchor coating agent was applied to the same unstretched polyethylene film as the intermediate layer A by the gravure coating method and dried, and an anchor coating layer having a thickness of 0.1 μm was provided. Next, a transparent gas barrier layer (an alumina vapor deposition film) formed of aluminum oxide and having a thickness of 10 nm was formed by a vacuum vapor deposition apparatus using an electron beam heating method. The O/Al ratio of the alumina vapor deposition film was set to 1.5 by adjusting deposition material species. The overcoat agent was applied onto the gas barrier layer by the gravure coating method and dried, and an overcoat layer having a gas harrier function and a thickness of 0.3 μm was formed.

As described above, an intermediate layer B on which a gas barrier layer formed of alumina was formed was obtained.

(Preparation of Intermediate Layer C)

An anchor coating agent was applied to the same unstretched polyethylene film as the intermediate layer A by the gravure coating method and dried, and an anchor coating layer having a thickness of 0.1 μm was provided. Next, a transparent gas barrier layer (a silica vapor deposition film) formed of silicon oxide and having a thickness of 30 μm was formed by a vacuum vapor deposition apparatus using an electron beam heating method. The O/Si ratio of the silica vapor deposition film was set to 1.8 by adjusting deposition material species.

As described above, an intermediate layer C on which a gas barrier layer formed of silica was formed and no overcoat layer is provided was obtained.

(Preparation of Intermediate Layer D)

The anchor coating agent was applied to a biaxially stretched polyethylene film (a three-layer structure of HDPE/MDPE/HDPE) having a thickness of 25 μm with both surfaces subjected to the corona treatment by the gravure coating method, and dried, and an anchor coating layer having a thickness of 0.1 μm was provided. Next, a transparent gas barrier layer (a silica vapor deposition film) formed of silicon oxide and having a thickness of 30 nm was formed by a vacuum vapor deposition apparatus using an electron beam heating method. The O/Si ratio of the silica vapor deposition film was set to 1.8 by adjusting deposition material species. The overcoat agent described above was applied onto the gas barrier layer by the gravure coating method and dried, and an overcoat layer having a gas barrier function and a thickness of 0.3 μm was formed.

As described above, an intermediate layer D on which a gas barrier layer formed of silica was formed was obtained.

(Preparation of Intermediate Layer E)

An anchor coating agent was applied to the same unstretched polyethylene film as the intermediate layer A by the gravure coating method and dried, and an anchor coating layer having a thickness of 0.1 μm was provided. Next, a transparent gas barrier layer (an alumina vapor deposition film) formed of aluminum oxide and having a thickness of 10 μm was formed by a vacuum vapor deposition apparatus using an electron beam heating method. The O/Al ratio of the alumina vapor deposition film was set to 1.5 by adjusting deposition material species.

As described above, an intermediate layer E on which a gas barrier layer formed of silica was formed and no overcoat layer is provided was obtained.

(Preparation of Base Layer Layer A)

The anchor coating agent described above was applied to an unstretched polyethylene film (a three-layer structure of HDPE/MDPE/HDPE) having a thickness of 25 μm with one surface subjected to the corona treatment by the gravure coating method, and dried, and an anchor coating layer having a thickness of 0.1 μm was provided. Next, a transparent gas barrier layer (a silica vapor deposition film) formed of silicon oxide and having a thickness of 30 nm was formed by a vacuum vapor deposition apparatus using an electron beam heating method. The O/Si ratio of the silica vapor deposition film was set to 1.8 by adjusting deposition material species.

As described above, a base layer layer A on which a gas barrier layer formed of silica was formed was obtained.

(Preparation of Base Layer Layer B)

The anchor coating agent described above was applied to a biaxially stretched polyethylene film (a three-layer structure of HDPE/MDPE/HDPE) having a thickness of 25 μm with one surface subjected to the corona treatment by the gravure coating method, and dried, and an anchor coating layer having a thickness of 0.1 μm was provided. Next, a transparent gas barrier layer (a silica vapor deposition film) formed of silicon oxide and having a thickness of 30 nm was formed by a vacuum vapor deposition apparatus using an electron beam heating method. The O/Si ratio of the silica vapor deposition film was set to 1.8 by adjusting deposition material species.

As described above, a base layer layer B on which a gas barrier layer formed of silica was formed was obtained.

Example 1

As a base layer, a uniaxially stretched polyethylene film (a three-layer structure of HDPE/MDPE/HDPE, haze value: 5%) having a thickness of 25 μm with one surface subjected to the corona treatment was prepared. An image was formed on the corona-treated surface of the base layer by the gravure printing method by using urethane-based ink. In addition, white urethane ink (with no light shielding property) was printed on the entire surface of the formed image by the gravure printing method. As described above, an ink layer formed of a plurality of inks was formed on the base layer.

Next, a surface of the base layer on which the ink layer is formed and a surface of the intermediate layer A on which the gas barrier layer is formed were joined by the first adhesive layer by a dry lamination method using a urethane-based adhesive.

In addition, an unstretched polyethylene film (a single-layer structure of LLDPE) having a thickness of 40 μm was prepared as the heat seal layer, and the intermediate layer and the heat seal layer were joined by the dry lamination method using the urethane-based adhesive.

As described above, a multilayer body according to Example 1 was obtained.

Example 2

A multilayer body according to Example 2 was obtained in the same procedure as in Example 1, except that a biaxially stretched polyethylene film (a three-layer structure of HDPE/MDPE/HDPE, haze value: 4.5%) having a thickness of 25 μm with one surface subjected to the corona treatment was used as the base layer.

Example 3

A multilayer body according to Example 3 was obtained in the same procedure as in Example 2, except that an ink layer having a light shielding property was formed on the base layer layer by printing light shielding sepia ink over the entire surface of a white urethane ink by the gravure printing method.

Example 4

A multilayer body according to Example 4 was obtained in the same procedure as in Example 3, except that the intermediate layer B was used instead of the intermediate layer A.

Example 5

The same heat seal layer as in Example 1 was prepared, and the heat seal layer was laminated on the gas barrier layer side of the intermediate layer C by the dry lamination method using an adhesive having the gas barrier property.

As the adhesive having the gas barrier property for forming the second adhesive layer, an epoxy-based adhesive obtained by mixing 16 parts by mass of Maxieve C93T manufactured by Mitsubishi Gas Chemical Company, Inc. and 5 parts by mass of Maxieve M-100 manufactured by Mitsubishi Gas Chemical Company, Inc: with 23 parts by mass of a solvent obtained by mixing ethyl acetate and methanol at a mass ratio of 1:1, was used. The thickness of the adhesive having the gas barrier property was set to 3 μm.

As a base layer, a biaxially stretched polyethylene film (a three-layer structure of HDPE/MDPE/HDPE, haze value: 5%) having a thickness of 25 μm with one surface subjected to the corona treatment was prepared. An image was formed on the corona-treated surface of the base layer by the gravure printing method by using urethane-based ink. In addition, white urethane ink (with no light shielding property) was printed on the entire surface of the formed image by the gravure printing method. As described above, an ink layer formed of a plurality of inks was formed on the base layer.

In addition, the ink layer side of the base layer and the intermediate layer side of the multilayer body of the intermediate layer C and the heat seal layer were joined by the dry lamination method using the urethane-based adhesive.

As described above, a multilayer body according to Example 5 was obtained. In this example, the second adhesive layer is formed of the adhesive having the gas barrier property.

Figure 3:
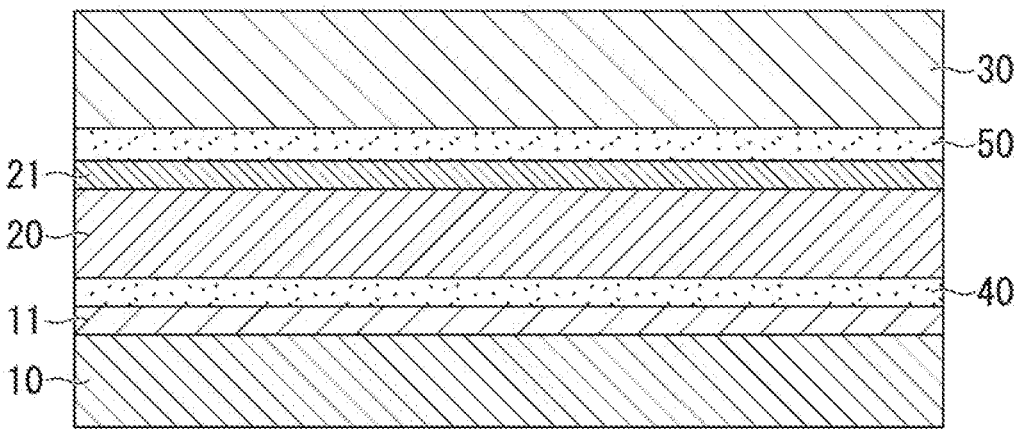
FIG. 3 is a schematic cross-sectional view of a multilayer body according to examples.

A layer structure of Example 5 is shown in FIG. 3. In Example 5, the gas barrier layer 21 is positioned on the heat seal layer 30 side.

Example 6

A multilayer body according to Example 6 was obtained in the same procedure as in Example 5, except that the intermediate layer E was used instead of the intermediate layer C.

Example 7

A multilayer body according to Example 7 was obtained in the same procedure as in Example 1, except that an unstretched polyethylene film (a three-layer structure of HDPE/MDPE/MDPE) having a thickness of 25 μm with both surfaces subjected to the corona treatment was used as the intermediate layer. Example 6 is an example in which the gas barrier layer is not provided.

Example 8

As a base layer, an unstretched polyethylene film (a three-layer structure of HDPE/MDPE/HDPE, haze value: 5%) having a thickness of 25 μm with one surface subjected to the corona treatment was prepared. At this time, no image was formed on the corona-treated surface of the base layer.

Next, the base layer and a surface of the intermediate layer D on which the gas barrier layer is formed were joined by the first adhesive layer by a dry lamination method using a urethane-based adhesive. A multilayer body according to Example 8 was obtained in the same procedure as in Example 1, except for the points described above.

Example 9

As the intermediate layer, a biaxially stretched polyethylene film (a three-layer structure of HDPE/MDPE/MDPE, haze value: 5%) having a thickness of 25 μm with both surfaces subjected to the corona treatment was prepared.

Next, the corona-treated surface of the intermediate layer and a surface of the base layer layer A on which the gas barrier layer is formed were joined by the first adhesive layer by a dry lamination method using an epoxy-based adhesive.

In addition, an unstretched polyethylene film (a single-layer structure of LLDPE) having a thickness of 40 μm was prepared as the heat seal layer, and the intermediate layer and the heat seal layer were joined by the dry lamination method using the urethane-based adhesive.

As described above, a multilayer body according to Example 9 was obtained.

Example 10

A multilayer body according to Example 10 was obtained in the same procedure as in Example 9, except that the base layer layer B was used instead of the base layer layer A.

Comparative Example 1

A multilayer body according to Comparative Example 1 was obtained in the same procedure as in Example 1, except that an unstretched polyethylene film (a three-layer structure of HDPE/MDPE/MDPE, haze value: 30%) having a thickness of 25 μm with one surface subjected to the corona treatment was used as the base layer.

Comparative Example 2

A multilayer body according to Comparative Example 2 was obtained in the same procedure as in Example 1, except that the intermediate layer D was used instead of the intermediate layer A.

Comparative Example 3

A multilayer body according to Comparative Example 3 was obtained in the same procedure as in Example 5, except that an unstretched polyethylene film three-layer structure of HDPE/MDPE/MDPE, haze value: 30%) having a thickness of 25 μm with one surface subjected to the corona treatment was used as the base layer.

The following evaluations were performed for the multilayer body according to each of the examples and the comparative examples.

(Recyclability)

The wt % of polyethylene in the multilayer body of each example was calculated based on Expression (1). The evaluation was performed to have two grades below.

○ (good): 90 wt % or more of polyethylene is contained.

X (bad): The content ratio of polyethylene is less than 90 wt %.

(Image Visibility)

For the multilayer body according to each example, an image was visually observed through the base layer from the surface opposite to the surface on which the ink layer is formed, and a sensory evaluation was performed. The evaluation was performed to have two grades below.

○ (good): The image is clearly visible.

X (bad): The image looks cloudy.

(Piercing Strength)

The piercing strength was measured based on JIS Z 1707:2019. The multilayer body according to each example was held flat by applying a tension, a hemispherical needle having a diameter of 1.0 mm and a tip with a radius of 0.5 μm was pressed from the base layer side at 50 mm/min, and a physical strength (Newton (N)) in a case where it is pierced was measured.

(Impact Resistance)

10 packaging bags having a size of 100 mm×150 mm with heat-sealed peripheral edge parts were manufactured by using the multilayer body according to each example.

Each of These packaging bags was filled with 200 g of distilled water, sealed by heat sealing, and stored at 5° C. for one day.

After the storage, each packaging bag was dropped from a height of 1.5 m 50 times, and the number of broken packaging bags was recorded.

(Light Shielding Property)

The light shielding property was measured by using a measuring instrument based on JIS K 7361-1:1997.

The multilayer body according to each example was irradiated with light from the base layer side, and a total light transmittance was measured.

(Oxygen Transmittance: OTR)

It was measured under conditions of 300 and 70% RH (relative humidity) by a MOCON method.

(Water Vapor Transmittance: WVTR)

It was measured under conditions of 40° and 90% RH by a MOCON method.

(Oxidation Suppression by Light Shielding)

A packaging bag having a size of 180 mm×250 mm with heat-sealed peripheral edge parts was manufactured by using the multilayer body according to each example. This packaging bag was filled with 60 g of potato chips as the contents, sealed by heat sealing, and stored for 2 weeks under an environment of −40° C. and 75% RH while being irradiated with light from a white fluorescent lamp (illuminance of 1000 Lx).

After a storage period had elapsed, the packaging bag was opened, and the content was taken out and pulverized. Fats and oils were extracted from the pulverized content using ethyl ether, and a peroxide value (POV) was measured.

The results are shown in Table 1.

TABLE 1

| No. | Base layer | Ink layer | Gas barrier layer | Intermediate layer | Recyclability | | |
|---|---|---|---|---|---|---|---|
| | | | | | Polyethylene proportion (wt %) | Evaluation | Image visibility |
| Example 1 | Uniaxially stretched PE | No light shielding property | SiOx | A (unstretched PE) | 94 | ○ | ○ |
| Example 2 | Biaxially stretched PE | No light shielding property | SiOx | A (unstretched PE) | 94 | ○ | ○ |
| Example 3 | Biaxially stretched PE | With light shielding property | SiOx | A (unstretched PE) | 92 | ○ | ○ |
| Example 4 | Biaxially stretched PE | With light shielding property | AlOx | B (unstretched PE) | 92 | ○ | ○ |
| Example 5 | Biaxially stretched PE | No light shielding property | SiOx | C (unstretched PE) | 93 | ○ | ○ |
| Example 6 | Biaxially stretched PE | No light shielding property | AlOx | E (unstretched PE) | 93 | ○ | ○ |
| Example 7 | Biaxially stretched PE | No light shielding property | None | Unstretched PE | 92 | ○ | ○ |
| Example 8 | Unstretched PE | No light shielding property | SiOx | D (biaxially stretched PE) | 94 | ○ | — |
| Example 9 | A (unstretched PE) | No light shielding property | SiOx | Biaxially stretched PE | 94 | ○ | — |
| Example 10 | B (biaxially stretched PE) | No light shielding property | SiOx | Unstretched PE | 94 | ○ | — |
| Comparative Example 1 | Unstretched PE | With light shielding property | SiOx | A (unstretched PE) | 92 | ○ | X |
| Comparative Example 2 | Biaxially stretched PE | No light shielding property | SiOx | D (biaxially stretched PE) | 94 | ○ | ○ |
| Comparative Example 3 | Unstretched PE | No light shielding property | SiOx | C (unstretched PE) | 92 | ○ | X |

| No. | Piercing strength (N) | Impact resistance | Light ray shielding property (transmittance %) | OTR (cc/mm$^2$ day · atm) | WVTR (g/m$^2$ · day) | Peroxide value (POV) (meq./kg) |
|---|---|---|---|---|---|---|
| Example 1 | 7.5 | 0/10 | 50 | 1.4 | 0.8 | 25 |
| Example 2 | 8.7 | 0/10 | 50 | 1.4 | 0.8 | 25 |
| Example 3 | 8.7 | 0/10 | 8 | 1.4 | 0.8 | 3 |
| Example 4 | 8.7 | 0/10 | 8 | 4.5 | 1.4 | 3 |
| Example 5 | 8.7 | 0/10 | 50 | 1.3 | 0.8 | 25 |
| Example 6 | 8.7 | 0/10 | 50 | 4.4 | 1.4 | 25 |
| Example 7 | 8.7 | 0/10 | 50 | 1480.0 | 2.0 | 150 |

TABLE 1-continued

| | | | | | | |
|---|---|---|---|---|---|---|
| Example 8 | 8.7 | 0/10 | 50 | 3.0 | 1.0 | 25 |
| Example 9 | 8.7 | 0/10 | 60 | 1.3 | 0.8 | 25 |
| Example 10 | 8.7 | 0/10 | 50 | 3.0 | 1.0 | 25 |
| Comparative Example 1 | 5.0 | 0/10 | 8 | 1.4 | 0.8 | 3 |
| Comparative Example 2 | 9.5 | 8/10 | 50 | 3.0 | 1.0 | 25 |
| Comparative Example 3 | 5.0 | 0/10 | 50 | 1.4 | 0.8 | 25 |

As shown in Table 1, all of the examples and comparative examples had high recyclability, but the multilayer body of Comparative Example 1, in which both the base layer and the intermediate layer were formed of the unstretched polyethylene film, was not sufficient in the image visibility and the piercing strength. Meanwhile, the multilayer body of Comparative Example 2, in which both the base layer and the intermediate layer were formed of the stretched polyethylene film, was not sufficient in impact resistance.

The multilayer body according to each example has a configuration in which the base layer was the stretched polyethylene film and the intermediate layer was the unstretched polyethylene film. Therefore, the piercing strength and the impact resistance were also excellent while having high recyclability.

In addition, even with the configuration in which the intermediate layer is the stretched polyethylene film and the base layer is the unstretched polyethylene film, the same effect can be obtained.

Furthermore, with the configuration in which the base layer is the stretched polyethylene film, the visibility of the image formed by the ink layer was also excellent.

Examples in which the gas barrier layer and the overcoat layer were provided exhibited excellent OTR and WVTR. In the examples in which the ink layer had the light shielding property, it was possible to suitably suppress the oxidation of the content due to light rays.

Hereinabove, each embodiment and examples of the present invention have been described, but the specific configuration is not limited to this embodiment and also includes modifications and combinations of the configurations without departing from the gist of the present invention.

For example, in the multilayer body of the present invention, the gas barrier layer may be provided on either the base layer side or the heat seal layer side of the intermediate layer.

In addition, in the multilayer body of the present invention, the gas barrier layer is not essential. That is, the gas barrier layer may be omitted in a case where the multilayer body is used for a packaging material with a content that does not require the barrier property.

INDUSTRIAL APPLICABILITY

The multilayer body of the present invention has a sufficient strength in a case of being applied to a packaging material and is easy to recycle.

What is claimed is:

1. A multilayer body comprising:
a base layer;
an intermediate layer;
a heat seal layer;
a first adhesive layer that is provided between the base layer and the intermediate layer, wherein the first adhesive layer is obtained by curing an adhesive having a gas barrier property; and
a second adhesive layer that is provided between the intermediate layer and the heat seal layer, wherein the second adhesive layer is obtained by curing an adhesive having a gas barrier property,
wherein the base layer, the intermediate layer, and the heat seal layer are configured to include polyethylene,
wherein the base layer is a stretched polyethylene film, and the intermediate layer is an unstretched polyethylene film, and
wherein a proportion of polyethylene in the multilayer body is 90% by mass or more.

2. The multilayer body according to claim 1,
wherein any one of the base layer and the intermediate layer includes a gas barrier layer.

3. The multilayer body according to claim 2,
wherein the gas barrier layer includes a deposited layer.

4. The multilayer body according to claim 3,
wherein the deposited layer is formed of metal oxide.

5. The multilayer body according to claim 1,
wherein
the base layer includes an ink layer on a first surface facing the intermediate layer.

6. The multilayer body according to claim 5,
wherein the ink layer has a light shielding property.

7. A packaging material formed of the multilayer body according to claim 1 by joining the heat seal layer.

* * * * *